United States Patent [19]

Dorfman et al.

[11] 3,935,361
[45] Jan. 27, 1976

[54] MAGNETIC IMPULSE RECORD ELEMENT LAMINATE AND METHOD OF MAKING SAME

[75] Inventors: Michael B. Dorfman, Clinton; Robert E. Logan, Easton, both of Conn.

[73] Assignee: Addressograph Multigraph Corporation, Cleveland, Ohio

[22] Filed: May 3, 1973

[21] Appl. No.: 356,917

[52] U.S. Cl. .................. 428/189; 40/2.2; 156/241; 156/309; 156/333; 427/131; 428/200; 428/329; 428/336; 428/339; 428/520; 428/900; 428/914
[51] Int. Cl.²... G11B 5/70; G11B 5/80; G11B 5/84; B32B 31/12
[58] Field of Search ............ 161/254, 145; 117/235, 117/236, 239; 156/230, 241, 240, 309, 333; 428/189, 329, 336, 337, 339, 520, 200, 900, 914; 40/2.2

[56] References Cited
UNITED STATES PATENTS

| | | | |
|---|---|---|---|
| 2,819,186 | 1/1958 | Franck | 117/239 |
| 3,041,222 | 6/1962 | Malmquist | 117/45 |
| 3,149,995 | 9/1964 | Bauer | 117/235 |
| 3,149,996 | 9/1964 | Wagner et al. | 117/239 |
| 3,497,411 | 2/1970 | Chebiniak | 156/289 |
| 3,515,590 | 6/1970 | Lazzarini et al. | 117/235 |
| 3,639,166 | 2/1972 | Fellows et al. | 117/234 |
| 3,725,184 | 4/1973 | Scopp | 161/254 |
| 3,754,959 | 8/1973 | Peters et al. | 117/235 |
| 3,808,079 | 4/1974 | Akashi et al. | 156/241 |

*Primary Examiner*—Harold Ansher
*Assistant Examiner*—Charles E. Lipsey

[57] ABSTRACT

A laminated article comprising a magnetic impulse record element secured to a vinyl plastic member through an interface of a composition containing polyvinyl chloride, polyvinyl acetate and polyvinyl alcohol. The interface contributes to the formation of a record element of improved quality when the latter is transferred as a magnetic coating from a carrier to the vinyl plastic member in a hot stamping operation.

9 Claims, 3 Drawing Figures

MAGNETIC IMPULSE RECORD ELEMENT LAMINATE AND METHOD OF MAKING SAME

This invention relates to the laminating art and more particularly to an improvement in laminated articles comprising a magnetic impulse record element secured to a vinyl plastic member.

The invention is particularly applicable to the manufacture of credit card blanks having a magnetic impulse record element, and will be described with particular reference thereto. However, it will be appreciated that the invention has much broader applicability and will find utility in the manufacture of any article which comprises the combination of a vinyl plastic member with a magnetic impulse record element.

In recent years, the credit card industry has directed its attention toward increasing the usefulness of credit cards in terms of the quantity and type of information that can be carried on the cards. Of ancillary interest has been the capability of changing and updating information carried by the card without having to issue a new card. Still further, the not insubstantial use of credit cards by unauthorized persons has created a desire to include on the card, machine readable information which identifies the rightful owner of the card.

In furtherance of these goals, a considerable amount of effort has been expended in the development of a credit card combined with a magnetic impulse record element. As well known, such elements are capable of storing a considerable amount of machine readable information on a very small surface area, and the information so stored can be readily erased and updated repeatedly without adversely affecting the quality of the record.

One way of utilizing such a credit card is to record on its magnetic impulse record element, a dollar credit limit which the credit card issuer will honor. Thereafter, as the card is used in purchase transactions, the initial credit limit amount would be erased and supplanted with a lower dollar amount corresponding to the difference between the starting credit limit and the amount of the transaction. In the event that the last recorded credit limit is lower than the amount of the proposed transaction, the card would not be honored. When the card owner pays his bill, the reduced credit limit stored on his card is erased and replaced with a new starting credit limit.

The magnetic impulse record element could also be used to store information about the physical characteristics of the rightful card holder. In this way, when a merchant places the card in a suitably equipped transaction printer, he has an opportunity to read the physical characteristics of the card owner and visually check them against the card presenter to see if his characteristics match those on the card. Many other uses of a composite credit card and magnetic impulse record element will suggest themselves to those skilled in the art.

The early attempts to combine a credit card with a magnetic impulse record element involved nothing more than adhesively securing a strip of magnetic recording or computer tape to a credit card blank. This proved to be less than satisfactory because of delamination problems.

This difficulty has in large measure been overcome by transferring from the magnetic tape only the coating portion which comprises a dispersion of magnetic particles in a binder matrix. This is accomplished by a hot stamping technique such as that conventionally practiced in stamping titles and designs on book bindings, and monograms and initials on luggage, etc.

Because the coating on the magnetic tape only is transferred from its carrier or backing strip to the credit card blank, the resulting magnetic impulse record element is much thinner than in the case where the magnetic tape is laminated to the credit card blank. This reduces the tendency of the record element to delaminate.

The hot stamping method for providing the credit card blank with a magnetic impulse record element suffers its own unique disadvantages. First, it produces a phenomenon which will be referred to as "cupping". This is characterized by a nonuniform concave curvature of the record element and the underlying area of the credit card blank. Cupping is believed to be caused by the flow of the vinyl plastic, from which the credit card is formed, in response to the pressure of the heated platen of the hot stamping equipment. The adverse affect it produces is manifested in variations in signal strength across the width of the magnetic impulse record element. Recording and playback heads are set a fixed distance from the record element, and as the latter recedes from the fixed head in following the contour of the cupped credit card blank, there is a concomitant reduction in signal strength.

The wider the stripe of magnetic impulse record element, the more severe the cupping problem. Experimentation has shown that the amount of cupping which accompanies the transfer of a stripe 0.3 inches wide is tolerable although improvement would be desirable. The amount of cupping which accompanies the transfer of a stripe 0.58 inches wide exceeds 200 microinches per 0.1 inch of stripe width, and this exceeds the tolerance limits for at least the recorder head used in the experiment. In each case, the heat needed to transfer the magnetic material from its carrier to the credit card blank dictated that the hot stamping platen be maintained at a temperature in excess of 400°F.

The second disadvantage of the hot stamping method is that even at platen temperatures of 400°F and above, heat stamping directly from a magnetic tape to a credit card blank can produce as low as a 50% yield and lower of satisfactory magnetic impulse record elements depending on the width of magnetic stripe transferred. The wider the stripe, the lower the yield. Defects range from small pinholes to large gaping areas caused by the coating on the magnetic tape being retained by its carrier and not transferred to the credit card blank. Because of the low yield and problems created by excessive "cupping", direct heat stamp transfer of the magnetic coating from a magnetic tape to a credit card blank is not deemed to be commercially practicable at least for stripes on the order of 0.5 inches and wider.

It is therefore apparent that there is a need for an improved vinyl plastic member such as a credit card blank having a magnetic impulse record element and an improved method of making the same. The present invention is addressed to filling these needs.

It has been found in accordance with the present invention that the difficulties described above in connection with the hot stamp transfer technique can be vastly improved, and substantially obviated by interposing between the magnetic impulse record element and the vinyl plastic member, such as a credit card blank, a composition comprising polyvinyl chloride, polyvinyl acetate and polyvinyl alcohol. The employment of such a coating composition permits the use of substantially lower stamping temperatures which in turn results in less severe "cupping" and yields in the 80 to 90% range even with stripes 0.5 inches wide and wider.

More specifically, and in accordance with one aspect of the present invention, there is provided as an article of manufacture, a vinyl plastic member having a surface at least a portion of which is provided with a coating consisting of the dry residue of a composition comprising, on a solid basis, from about 88 to about 94 weight percent polyvinyl chloride, from about 2 to about 6 weight percent polyvinyl acetate, and from about 2 to about 10 weight percent polyvinyl alcohol, and a magnetic impulse record element comprising a dispersion of magnetic particles in a binder matrix, overlying and bonded to the coating.

In accordance with another aspect of the present invention, there is provided in a method of forming on a surface of a vinyl plastic member, a magnetic impulse record element by hot stamp transferring thereto from a carrier, a composition comprising a dispersion of magnetic particles in a binder matrix, the improvement which comprises providing an interface between the record element and the surface of the vinyl plastic member consisting of the dry residue of a partially hydrolyzed, vinyl chloride-vinyl acetate copolymer, comprising of a solids basis, from about 88 to about 94 weight percent polyvinyl chloride, from about 2 to about 6 weight percent polyvinyl acetate and from about 2 to about 10 weight percent polyvinyl alcohol.

It is therefore an object of the present invention to provide an improved vinyl plastic member having a magnetic impulse record element formed thereon.

A further object of the invention is to provide a vinyl plastic credit card blank with a magnetic impulse record element thereon in higher yields, with less "cupping" and at lower stamping temperatures than achieved by the prior art.

A further object of the invention is to provide an article of the type described wherein an interface is provided between the vinyl plastic member and the magnetic impulse record element consisting of the dry residue of a composition comprising polyvinyl chloride, polyvinyl acetate and polyvinyl alcohol.

Still another object of the invention is to provide an improved method of manufacturing a vinyl plastic member having a magnetic impuse record element formed thereon.

These and other objects and advantages of the invention will become apparent from the detailed description thereof when taken into conjunction with the accompanying drawing wherein.

Figure 1:
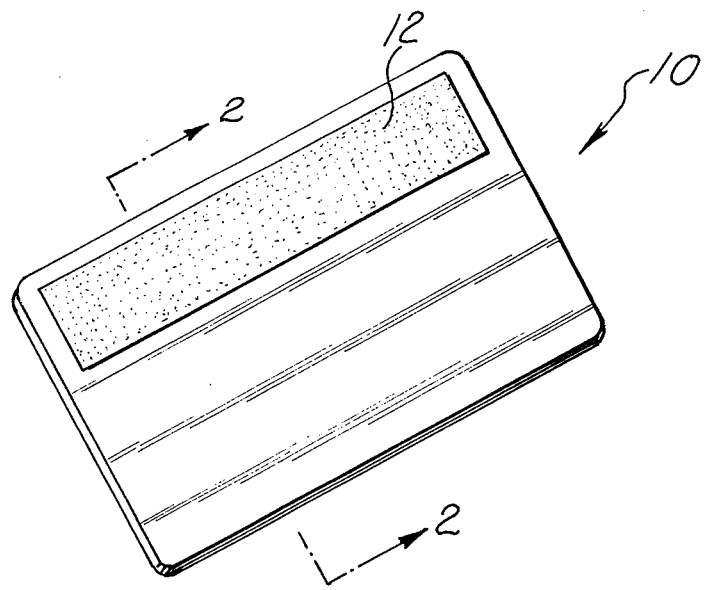
FIG. 1 is a schematic, pictorial representation of a credit card blank having a magnetic impulse record element thereon.

Turning to the drawings, it will be seen that FIG. 1 pictorially represents a credit card, designated generally as 10, to which has been applied magnetic impulse record element 12.

Figure 2:
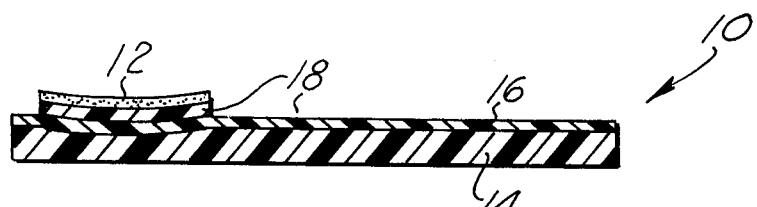
FIG. 2 is a schematic, sectional view taken generally along line 2—2 of FIG. 1 with the proportions and dimensions greatly exaggerated for purposes of clarity; and, FIG. 3 is a schematic, sectional view similar to FIG. 2, but showing a modified form of the invention.

As best seen in FIG. 2, credit card 10 comprises core 14 consisting of a rigid, but bendable vinyl plastic sheet, to which is laminated skin 16 which is an unplasticized vinyl plastic film. In the context of the present invention the film is optional, but is included in the preferred embodiment because most credit cards are so constructed. The film protects the printed matter applied to the vinyl plastic sheet and provides the card with a smooth shiny surface.

For purposes of this disclosure, the term "vinyl plastic" as applied to sheet and films is intended to define such materials in which the resin ingredient consists essentially of a homopolymer of polyvinyl chloride or a copolymer consisting of a major proportion of polyvinyl chloride and a minor proportion of polyvinyl acetate. Other ingredients conventionally present in vinyl plastic compositions such as fillers, colorants, stabilizers, etc. are also contemplated.

Commercially available vinyl plastic sheet which may be used in the practice of the present invention include Emelux V265B-6 manufactured by Addressograph-Multigraph Corporation, Nixon 5193 manufactured by Nixon-Baldwin Division of Tenneco, Inc., and Union Carbide 3603 manufactured by Union Carbide Corporation.

Commercially available vinyl plastic film which may be used in the practice of the invention include Emelux V018A-1 manufactured by Addressograph-Multigraph Corporation, Nixon 1142 manufactured by Nixon-Baldwin Division of Tenneco, Inc., and Union Carbide 0411 and 0414 manufactured by Union Carbide Corporation.

Conventional sheet thicknesses will generally be in the range of about 0.01 inches to about 0.03 inches, while conventional film thicknesses are in the range of about 1 to about 3 mils.

Referring again to FIG. 2, it will be seen that there is interposed between magnetic impulse record element 12 and vinyl plastic film 16, coating 18 which consists of the dry residue of a composition containing polyvinyl chloride, polyvinyl acetate and polyvinyl alcohol. In this embodiment, coating 18 is generally coextensive in width and length with magnetic impulse record element 12. This can be accomplished by applying the coating to a localized area of credit card blank 10, or by applying it to the surface of the magnetic coating material prior to the hot stamp transference of the magnetic material to the surface of the credit card blank.

Figure 3:
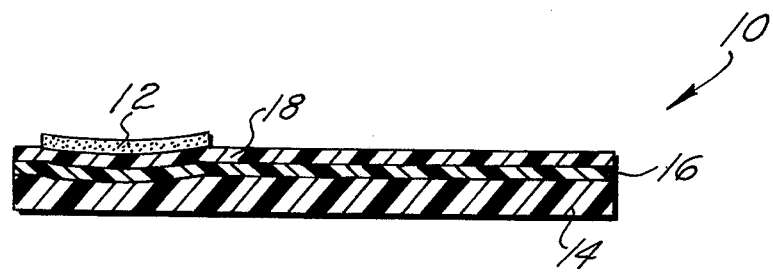

Referring to FIG. 3, it will be seen that in this modified embodiment coating 18 covers the entire surface of credit card blank 10. In the practice of this embodiment, coating 18 may be applied either to the credit card blank or to the vinyl plastic film, preferably the latter.

Coating 18 may be applied by any conventional coating method including spray, brush, or roller application. In practicing the embodiment illustrated in FIG. 2, when the coating is applied to a localized portion of the surface of credit card blank 10, it is preferred to use a mask or screen to limit the area of application of the coating, but this is not essential. Use of a narrow brush or roller is also contemplated.

The "cupping" phenomenon described above is readily apparent from the drawings because the showing is greatly exaggerated. It will be appreciated, however, that as a practical matter, cupping provides only a slightly concave curvature to the exposed surface of magnetic impulse record elements, and to the underlying portions of coating 18, film 16 and sheet 14.

As noted above, magnetic impulse record element 12 may be formed of the magnetic coating composition used in magnetic recording and computer tapes.

In general, such magnetic coating compositions comprise a dispersion of magnetic particles in a binder matrix. In most conventional tapes, the magnetic ingredient in the coating composition consists of acicular (needle shaped) particles of gamma ferric oxide. These particles have lengths within the range of about 0.2 to about 0.8 microns, preferably 0.3 to 0.5 microns, and length to breadth ratios within the range of about 2:1 to about 8:1.

Other magnetic materials, although more costly, may also be used including cobalt doped gamma ferric oxide, chromium dioxide, acicular iron, cobalt or nickel particles, and cobalt-phosphorus, nickel-phosphorus and cobalt-nickel-phosphorus layers deposited by electroless of electrolytic methods.

The other major ingredient in the magnetic coating composition is a resin binder which may consist of one or more of a number of thermoplastic resinous binders including vinyl chloride-vinyl acetate copolymers, vinylidene chloride/acrylonitrile copolymers, butadiene/styrene rubber polymers, and polyurethane elastomers.

In addition to these ingredients, the magnetic coating compositions conventionally contain a conductive agent, mostly commonly the various forms of carbon black, which serves the purpose of controlling the conductivity of the composition to prevent build up of static charges; a dispersant, to assist in wetting out the magnetic particles, such as zinc naphthenate, dioctyl sodium sulfosuccinate, the mono-di and tri-esters of oleic acid and triethanolamine. Other ingredients which may be included are stabilizers, lubricants and plasticizers.

The thickness of the coating of the magnetic composition on magnetic tapes is fairly well standardized at 2.2 mils, 1.7 mils and 0.7 mils. Any of these may be used in the practice of the present invention.

The two most common carriers or supports for the magnetic composition, i.e. the tape itself, are films of cellulose acetate and polyester resins. Of these two classes of resins, the latter is the most popular, and most widely used polyester is polyethylene terephthalate. Much of this is sold under the DuPont Trademark Mylar. The thickness of the carrier or backing strip is conventionally within the range of 0.0005 to 0.0015 inches.

Compositions containing polyvinyl chloride, polyvinyl acetate and polyvinyl alcohol, which may be used as coating 18, are commercially available. In general, it has been found that very satisfactory results are achieved with compositions comprising on a solids basis, from about 88 to about 94 weight percent polyvinyl chloride, from about 2 to about 6 weight percent polyvinyl acetate, and from about 2 to about 10 weight percent polyvinyl alcohol.

A suitable commercial composition falling within this range of proportions is sold by Union Carbide Corporation under the designation, VAGH. This material, described by its manufacturer as a partially hydrolyzed, vinyl chloride-vinyl acetate copolymer, is believed to contain about 91 weight percent polyvinyl chloride, about 3 weight percent polyvinyl acetate and about 6 weight percent polyvinyl alcohol, on a solids basis.

To be useful in the practice of the invention the partially hydrolyzed copolymer should be diluted with a suitable solvent to provide a coating composition containing from about 5 to about 18 weight percent solids. Compositions containing about 7 weight percent solids are particularly satisfactory.

The particular solvent employed should be selected so that in the time it takes for evaporation, it will not have any substantial detrimental effect on the vinyl film or vinyl sheet. Further, the solvent should evaporate within a reasonable period of time at temperatures not exceeding about 150°F lest distortion of the substrate occur during drying of the coating. Suitable commercially available solvents include ethyleneglycol monoethyl ether, and ethyleneglycol monomethyl ether, both sold by Union Carbide Corporation under the trademarks Cellosolve and Methyl Cellosolve, respectively. Coating thicknesses within the range of about 0.01 to about 0.03 mils will produce satisfactory results. In general, coatings thicker than about 0.03 mils may be used, but are difficult to justify economically because they produce no further improvement in results.

The efficacy of the invention was confirmed by a series of experimental runs in which magnetic impulse record elements of 0.58 inches wide were formed on large numbers of credit card blanks by a hot stamping transfer method.

In all the runs, the same card stock was employed and the magnetic coating was transferred from the same magnetic recording tape stock (manufactured by 3M Corporation under the designation MTA 20730). Further, the same hot stamping equipment was employed, with the ram force and dwell time being held constant throughout. The platen temperature was adjusted, however, for reasons explained below.

In four of the seven runs reported below, coating 18 was omitted, while it was included in the remaining three runs.

The hot stamping operation was conducted on a 8100 special model machine manufactured by Franklin Manufacturing Company. The machine feeds a credit card blank to a hot stamp work station and indexes a length of magnetic recording tape across the portion of the blank at the work station to which the magnetic coating on the tape is to be transferred. The tape is disposed with the carrier or support portion facing away from the credit card blank so that the magnetic coating on the tape is in juxtaposition with the credit card blank. The hot stamping platen, preheated to a set temperature is lowered under a ram force and maintained in contact with the carrier side of the magnetic recording tape for a preset dwell time.

The credit card blank used throughout the test runs was formed of a vinyl plastic sheet 0.0625 inches thick manufactured by Addressograph-Multigraph Corporation and sold under the designation Emelux V265B-6. To each surface of the sheet was laminated a vinyl plastic film 1.8 mils thick manufactured by Addressograph-Multigraph Corporation and sold unnder the designation Emelux V018A-1.

A coating of Union Carbide Corporation partially hydrolyzed copolymer VAGH in a solvent was applied to one surface of the vinyl plastic film, prior to lamination to the vinyl plastic sheet, providing a dry coating having an average thickness of 0.2 mils.

The platen temperatures, dwell time and ram force at which the hot stamping machine was operated are set forth in the table below, together with the cupping values and yield percent for each run.

| RUN NO. | NO. OF COAT-INGS | PARTIALLY HYDRO-LYZED COPOLY-MER | PLATEN TEMP. (°F) | DWELL TIME (Milliseconds) | RAM FORCE (Tons) | CUPPING Micro Inch/ 0.1 Inch Strip Width (%) | YIELD |
|---|---|---|---|---|---|---|---|
| CARDS | ING | | | | | | |
| 1 | 410 | No. | 410 | 80 | 8 | 230 | 41 |
| 2 | 380 | No | 410 | 80 | 8 | 225 | 12 |
| 3 | 440 | No | 410 | 80 | 8 | 265 | 13 |
| 4 | 480 | Yes | 330 | 80 | 8 | 95 | 80 |
| 5 | 490 | Yes | 340 | 80 | 8 | 185 | 89 |
| 6 | 480 | Yes | 330 | 80 | 8 | 170 | 88 |
| 7 | 550 | No | 330 | 80 | 8 | — | 0 |

Cupping values were arrived at by readout of an amplified electrical signal generated by a commercially available instrument manufactured by Federal Products Corporation and sold under the name Federal Electronic Gage, which is comprised of a gauging head which measures distortions in the profile of the magnetic impulse record element while moving perpendicular to the longitudinal axis thereof.

The yield values were arrived at by calculation based on a visual inspection of every credit card blank in each run for pinholes, voids and scratches.

Comparing runs 1, 2, 3 and 7 with runs 4, 5 and 6, it is apparent that employment of hydrolyzed copolymer by the present invention permits the use of a lower platen temperature which in turn is probably responsible in large measure for the reduction in cupping achieved. Quite surprising was the finding that use of the hydrolyzed copolymer increased yields from two to seven fold. This was unexpected in view of the fact that Union Carbide literature states that coatings of its hydrolyzed copolymer have appreciably higher melting points than similar polyvinyl chloride-polyvinyl acetate films.

Run 7 reported in the table confirms that no satisfactory blanks were obtained when operating at the reduced platen temperature without the hydrolyzed copolymer.

Having thus described our invention, we claim:

1. As an article of manufacture, a vinyl plastic member having a surface at least a portion of which is provided with a coating consisting of a dry residue of a partially hydrolyzed vinyl chloride-vinyl acetate copolymer comprising, on a solids basis, from about 88 to about 94 weight percent polyvinyl chloride, from about 2 to about 6 weight percent polyvinyl acetate, and from about 2 to about 10 weight percent polyvinyl alcohol activatable to an adhesive condition when heated and a transferrable magnetic impulse record element greater than 0.3 inches in width carried on a separable backing strip comprising a dispersion of magnetic particles in a binder matrix overlying and bonded to said coating by a hot stamping process, said coating having a thickness in the range of 0.01 to 0.03 mils and forming an interface between the record element and the vinyl plastic member whereby the amount of cupping which accompanies the transfer of the impulse record is less than 200 microinches per 0.1 inch of the record element width.

2. The article as defined in claim 1 wherein said vinyl plastic member comprises a rigid, bendable sheet of vinyl plastic.

3. The article as defined in claim 1 wherein said vinyl plastic member comprises a core of a rigid, bendable sheet of vinyl plastic having laminated to at least one surface thereof a film of vinyl plastic, said coating being provided on the exposed surface of said film.

4. The article as defined in claim 3 wherein said magnetic impulse record element is in the form of a stripe on said vinyl plastic member.

5. In a method of providing a surface of a vinyl plastic substrate with a magnetic impulse record element greater than 0.3 inches in width by transferring to said member from a carrier by a hot stamping process a composition comprising a transferrable dispersion of magnetic particles in a binder matrix carried on a separable backing strip the improvement comprising: coating the vinyl substrate to provide an interface between the element and the substrate with a heat responsive coating having a thickness in the range of 0.01 to 0.03 mils consisting of the dry residue of a partially hydrolyzed vinyl chloride-vinyl acetate copolymer comprising on a solids basis from about 88 to about 94 weight percent polyvinyl chloride, from about 2 to about 6 weight percent polyvinyl acetate and from about 2 to about 10 weight percent polyvinyl alcohol, said coating being applied to the substrate prior to the hot stamping process whereby the amount of cupping which accompanies the transfer of the magnetic impulse record is less than 200 microinches per 0.1 inch of element width.

6. The method as defined in claim 5 wherein said interface is provided by applying a solvent solution of said partially hydrolyzed copolymer to the surface of said vinyl plastic member prior to conducting the hot stamp transfer step.

7. A credit card blank comprising a vinyl sheet member having a surface at least a portion of which is provided with a coating having a thickness in the range of 0.01 to about 0.03 mils consisting of the dry residue of a partially hydrolyzed vinyl-chloride vinyl-acetate copolymer comprising on a solids basis from about 88 to about 94 percent polyvinyl chloride, from about 2 to about 6 percent polyvinyl acetate and from about 2 to about 10 weight percent polyvinyl alcohol, a transferrable magnetic impulse record element greater than 0.3 inches in width carried on a separable backing strip comprising a dispersion of magnetic particles in a binder matrix overlying and bonded to said coating by a hot stamping process, said coating providing an interface between said sheet member and said record element whereby the amount of cupping which accompanies the transfer of the impulse record element is less than 200 microinches per 0.1 inch of width.

8. The credit card blank as defined in claim 7 wherein a film of vinyl plastic is laminated to said vinyl sheet member and interposed between said vinyl sheet member and said coating.

9. The credit card blank as defined in claim 8 wherein said magnetic impulse record element is in the form of a stripe.

* * * * *